(12) United States Patent
Yamazaki

(10) Patent No.: US 7,672,054 B2
(45) Date of Patent: Mar. 2, 2010

(54) ILLUMINATION HOMOGENIZING OPTICAL ELEMENT

(75) Inventor: Kentaro Yamazaki, Hamburg (DE)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 12/470,684

(22) Filed: May 22, 2009

(65) Prior Publication Data

US 2009/0231858 A1    Sep. 17, 2009

Related U.S. Application Data

(62) Division of application No. 11/878,015, filed on Jul. 20, 2007, now Pat. No. 7,554,739.

(30) Foreign Application Priority Data

Aug. 4, 2006   (JP)   ............................ 2006-212763

(51) Int. Cl.
*G02B 27/10* (2006.01)
*G02B 27/12* (2006.01)

(52) U.S. Cl. ................. 359/626; 359/625; 359/639

(58) Field of Classification Search ................. 359/385, 359/389, 616, 625, 626, 639, 798; 362/339
See application file for complete search history.

(56) References Cited

U.S. PATENT DOCUMENTS

| 7,443,578 B2 * | 10/2008 | Yamazaki et al. ........... 359/387 |
| 7,554,739 B2 * | 6/2009 | Yamazaki .................... 359/626 |
| 2007/0268575 A1 * | 11/2007 | Yamazaki .................... 359/389 |
| 2009/0034063 A1 * | 2/2009 | Yamazaki et al. ........... 359/387 |

FOREIGN PATENT DOCUMENTS

| JP | 2005-215992 | 8/2005 |
| JP | 2006-30535 | 2/2006 |

* cited by examiner

*Primary Examiner*—David N Spector
(74) *Attorney, Agent, or Firm*—Arnold International; Bruce Y. Arnold

(57) ABSTRACT

An illumination homogenizing optical element is disclosed that includes at least one optical surface having a plurality of refractive structures formed as either grooves or protrusions that, individually, are wider than the wavelength of light incident onto said illumination homogenizing optical element. At least part of the light incident onto the illumination homogenizing optical element is removed from the optical path by refraction of said light so as to provide even illumination on an illuminated surface. The illumination homogenizing optical element is advantageous over prior art illumination homogenizing optical elements in that it is easy and inexpensive to manufacture while providing sufficient optical performance.

6 Claims, 10 Drawing Sheets

$T = 1 - [(N'-N)^2 / (N'+N)^2]$

Distance from the Optical Axis

ILLUMINATION HOMOGENIZING OPTICAL ELEMENT

This application claims the benefit under 35 U.S.C. 119 of JP 2006-212,763 filed Aug. 4, 2006, the contents of which are hereby incorporated by reference.

BACKGROUND OF THE INVENTION

In recent years, there have been increasing opportunities to photograph samples using a digital camera. Digital cameras using a sensor such as a CCD and a CMOS are more sensitive to brightness changes than are direct observations with human eyes or photographing with silver salt film cameras. Because of this, non-uniformity in illumination, which is not a problem in direct eye observations or photographing with silver salt film cameras, is a significant problem when photographing with digital cameras. Therefore, in illumination devices for microscopes, there has arisen a need to further increase the uniformity of illumination.

A conventional measure against non-uniformity in illumination is using the so-called Keller illumination technique, which theoretically provides a uniform illumination on a sample surface. However, because the light intensity distribution over the angular direction of light emitted by the light source is not uniform, non-uniformity in illumination still occurs. Although uniform illumination without any non-uniformity in illumination can be obtained if the angular distribution of light emitted from the light source can be made uniform, this is difficult to achieve in actuality.

As a means to improve the illumination non-uniformity caused by the angular distribution of light, a conventional method has been used wherein an integrator, such as a fly-eye lens, is used to divide a light flux into many parts; thus each part has a more uniform illumination. However, there has been the difficulty that adopting this method makes the illumination optical system device itself large, thereby increasing the cost.

Japanese Patent Application 2005-215992 proposes a method of correcting a non-uniform illumination distribution using an optical element such as a neutral density (hereinafter ND) filter and a frosted filter. A similar optical element is also disclosed in Japanese Laid Open Patent Application 2006-30535. Each of these prior art examples of correcting a non-uniform illumination distribution has problems. For example, if an ND filter is used, the influence of wavelength characteristics cannot be avoided. In other words, using an ND filter does not satisfy the objective of reproducing accurate color by illumination with white light. On the other hand, if a frosted filter is used, there is the problem such that it cannot be processed to have the exact transmittance as calculated (through a numerical simulation). Namely, there remains the inaccuracy that the transmittance calculated in the design stage cannot be realized.

Moreover, in Japanese Laid Open Patent Application 2006-30535, an illumination distribution is corrected using an optical element having a transmittance distribution that directly complements (i.e., is the inverse of) the intensity distribution of the light source. Thus, this method of correcting a non-uniform illumination distribution does not truly utilize the characteristics of the illumination optical system.

BRIEF SUMMARY OF THE INVENTION

The present invention relates to an optical element that corrects non-uniformity in illumination light emitted from a light source, and a device using the optical element. In order to solve the above discussed problems, an optical element is provided which, in principle, has a different transmittance distribution from the optical element disclosed in Japanese Patent Application 2005-215992. Moreover, the optical element according to the present invention corrects a non-uniform distribution of illumination while utilizing the optical characteristics of the illumination system.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
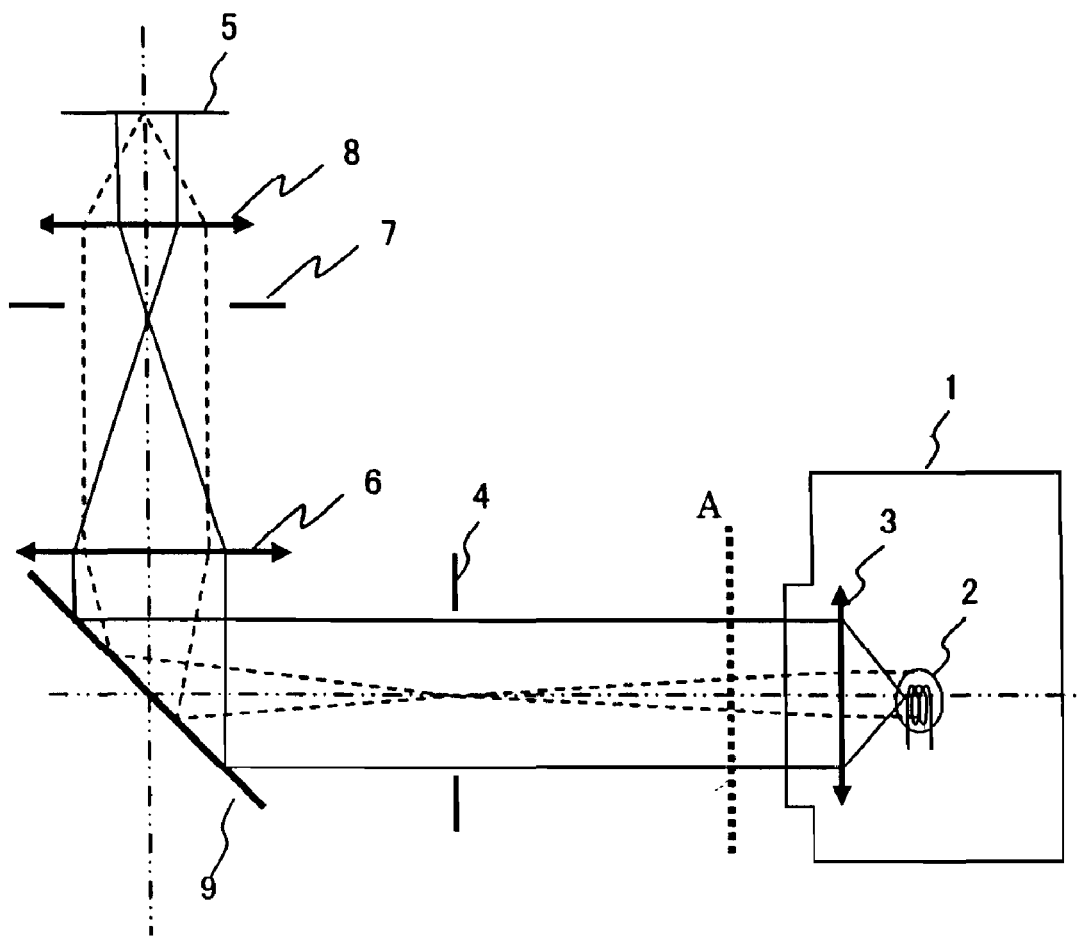
FIG. 1 shows a conventional illumination device.

The present invention provides an illumination homogenizing optical element characterized by having refractive structures on at least one optical surface, such as prism-like grooves or protrusions, that are wider than the wavelength of light to be homogenized that is incident on the illumination homogenizing optical element and these are positioned with an interval between neighboring refractive structures that is wider than the wavelength of light to be homogenized that is incident on the illumination homogenizing optical element. The refractive structures remove a part or all of the incident light from the light path by refracting a portion or all of the incident light out of the light path defined by the direction of the incident rays. The term "pitch" herein refers to a distance from a point on one diffractive structure to a corresponding point on an adjacent diffractive structure. When the width and interval between adjacent refractive structures of the illumination homogenizing optical element are each greater than the wavelength of light used, the main diffraction lobe of light that is diffracted by the refractive structures will subtend an angle of about 0.6 radians, which allows such light to be entirely removed from the optical path (defined by the direction of the center ray of light incident onto the illumination homogenizing optical element) by the prism effect of the refractive structures. In this manner, the intensity of diffracted light that is not removed from the light path by refraction is made to be sufficiently small that diffraction of light caused by the refractive structures can be ignored.

The refractive structures may be formed as prism-shaped grooves in the surface or as prism-shaped protrusions on the surface. The refractive structures may be formed by molding processing or by cutting processing. In the case where the refractive structures are grooves, production by cutting processing is preferred. In the case where the refractive structures are protrusions, production by molding processing is preferred. In either case, the efficacy of the present invention does not essentially change. It is also preferred that the prism-shaped grooves or protrusions each have one surface that is aligned with the light incident onto the illumination homogenizing optical element. In other words, one surface of the prism-shaped groove or protrusion has its surface normal perpendicular to the direction of light that is incident onto the illumination homogenizing optical element. Furthermore, it is preferred that the refractive structures be concentric and centered on the optical axis of the illumination homogenizing optical element.

Because a typical illumination non-uniformity has stronger illumination near the center than at the periphery of the illumination, it is preferred that the pitch (defined above as being measured in linear units) increases (i.e., the number of diffractive structures per mm decreases) when proceeding from the optical axis center to the periphery of the illumination homogenizing optical element. The illumination homogenizing optical element may be made of plastic, glass or any other optically transparent material.

It is also preferred that the illumination homogenizing optical element of the present invention be utilized in an illumination device and, more preferably, in a Keller illumination device.

The illumination homogenizing optical element of the present invention may be used as a component in a microscope, in a projector, or in a stepper (e.g., a projection-type exposure device).

According to the present invention, an illumination homogenizing optical element with a low wavelength dependency is provided by controlling the transmitted light according to the principles of geometrical optics, namely, by refracting out undesired portions of the incident light. Also, because the illumination homogenizing optical element of the present invention is realized using refractive structures such as prism-shaped grooves or protrusions, processing is very easy, and products with few individual differences can be manufactured.

Furthermore, because of a synergism between the calculations being simple (due to their being based on simple principles of geometrical optics) and due to the optical processing of the illumination homogenizing optical element itself also being easy to manufacture, manufactured products that faithfully correlate with theoretical values in the design stage may be easily manufactured.

An embodiment of the present invention will now be explained with reference to the drawings. While the explanation given below is for homogenizing the illumination for a microscope, the present invention is not limited to such applications. For example, the present invention also may be applied to homogenize the illumination of projection devices and exposure devices such as projectors and steppers. The present invention is thus applicable to any type of optical system wherein an illumination non-uniformity of a light source is to be corrected.

FIG. 1 shows a conventional illumination device that uses what is termed Keller illumination. A lamp housing 1 encloses a light source 2 and a collector lens 3 that converts diverging rays emitted from the light source 2 into substantially collimated light. A field stop 4 that limits the angular range of illumination is placed at a conjugate position to an illuminated surface 5. Substantially collimated light travels from the lamp housing 1, passes through the field stop 4, is reflected by a mirror 9 which folds the optical path 90 degrees, and is then condensed onto a plane at an aperture stop 7 by a field lens 6. Then, the light passes through a condenser lens 8, and illuminates the surface 5.

If we assume that the Keller illumination shown in FIG. 1 can make the angular distribution of light emitted from the light source 2 to be uniform, illumination without any illumination non-uniformity can, in principle, be provide by the illumination optical system of FIG. 1. However, the angular distribution of light emitted by an actual light source is not uniform, causing illumination non-uniformity. A typical non-uniformity in illumination shows a higher illumination intensity in the vicinity of the optical axis that decreases toward the periphery.

Figure 2:
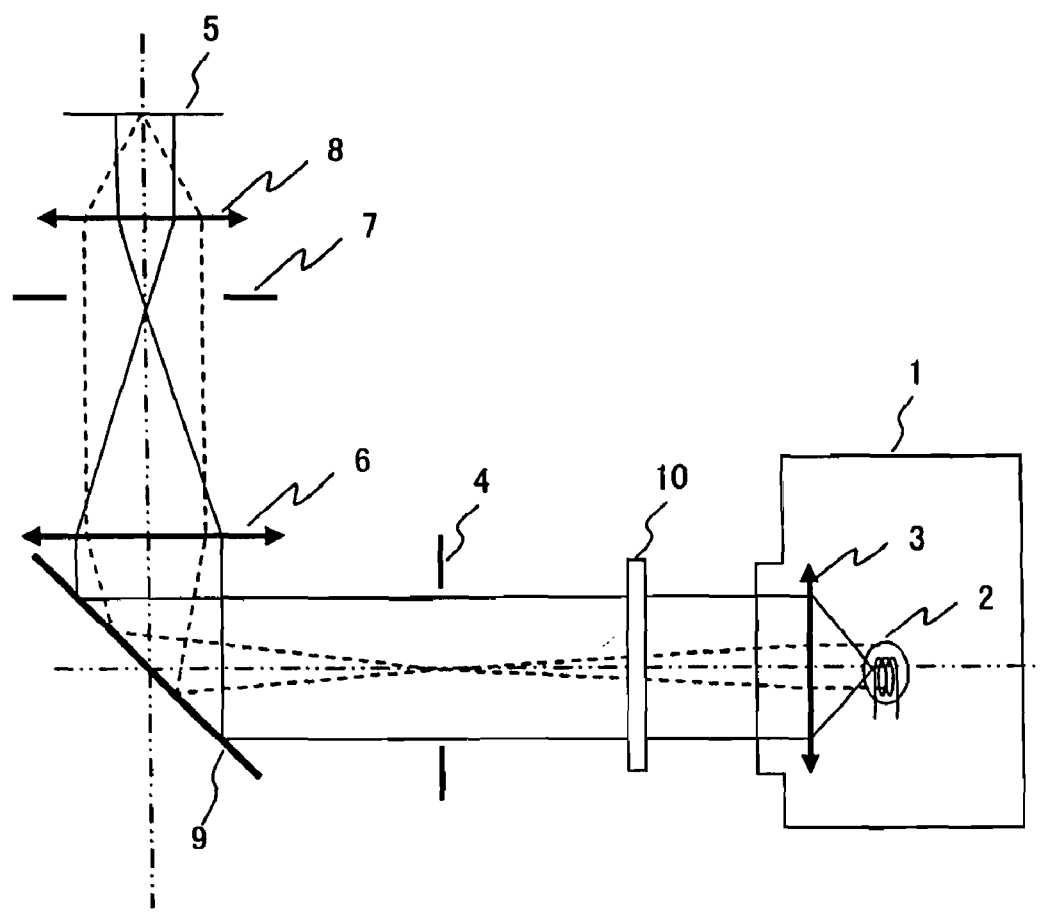
FIG. 2 shows a filter inserted within a light path of the illumination device shown in FIG. 1, for correcting for non-uniformity in illumination of the light source shown in FIG. 1.
Figure 3A:
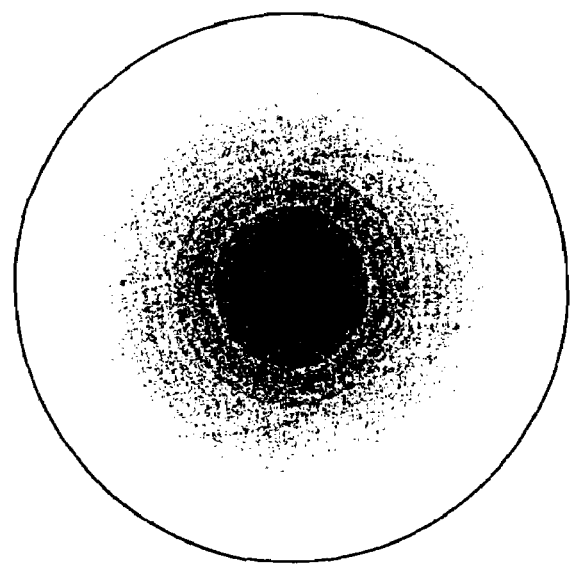
FIG. 3(a) shows an example of a conventional illumination homogenizing neutral density filter, as viewed along the optical axis of the filter.
Figure 3B:
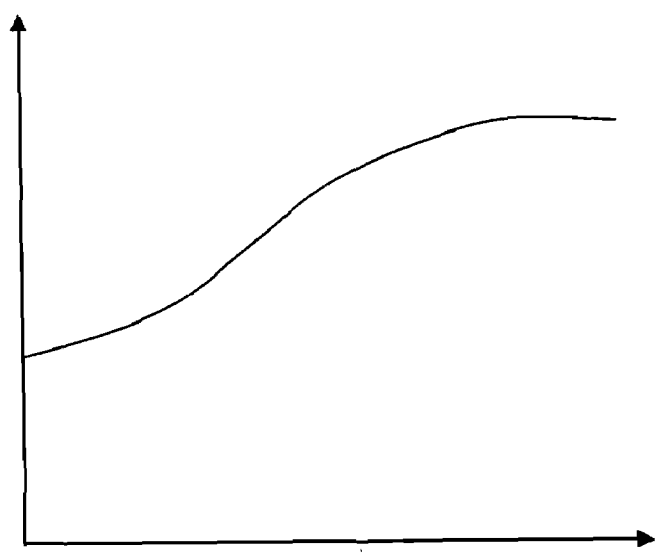
FIG. 3(b) illustrates the transmittance versus the distance from the optical axis of the illumination homogenizing neutral density filter shown in FIG. 3(a)
Figure 4A:
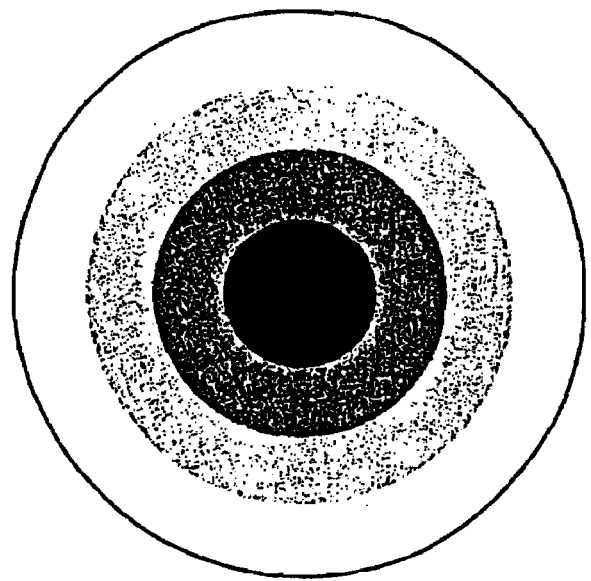
FIG. 4(a) shows another example of a conventional illumination homogenizing neutral density filter, as viewed along the optical axis of the filter.
Figure 4B:
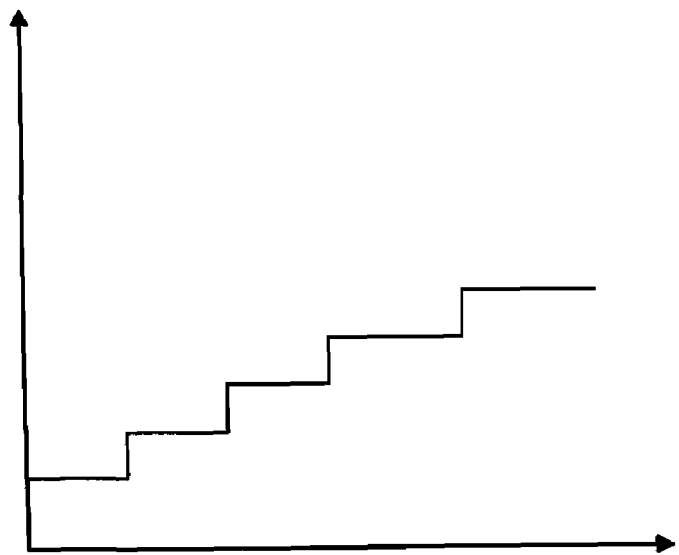
FIG. 4(b) illustrates the transmittance versus the distance from the optical axis of the illumination homogenizing neutral density filter shown in FIG. 4(a)

FIG. 2 discloses an illumination homogenizing optical element 10 that is inserted between the collector lens 3 and the field stop 4 for correcting an illumination distribution. Such a modification to the apparatus of FIG. 1, is taught in, for example, Japanese Patent Application 2005-215992. In one embodiment of the illumination homogenizing optical element used in Japanese Patent Application 2005-215992, the transmittance increases toward the periphery as shown in FIGS. 3(a) and 3(b). In another embodiment of the illumination homogenizing optical element used in Japanese Patent Application 2005-215992, the transmittance increases toward the periphery as shown in FIGS. 4(a) and 4(b). Although both embodiments provide sufficient optical performance to correct illumination non-uniformity, both embodiments have some unsatisfactory aspects from the viewpoint of commercializing the invention.

Figure 10:
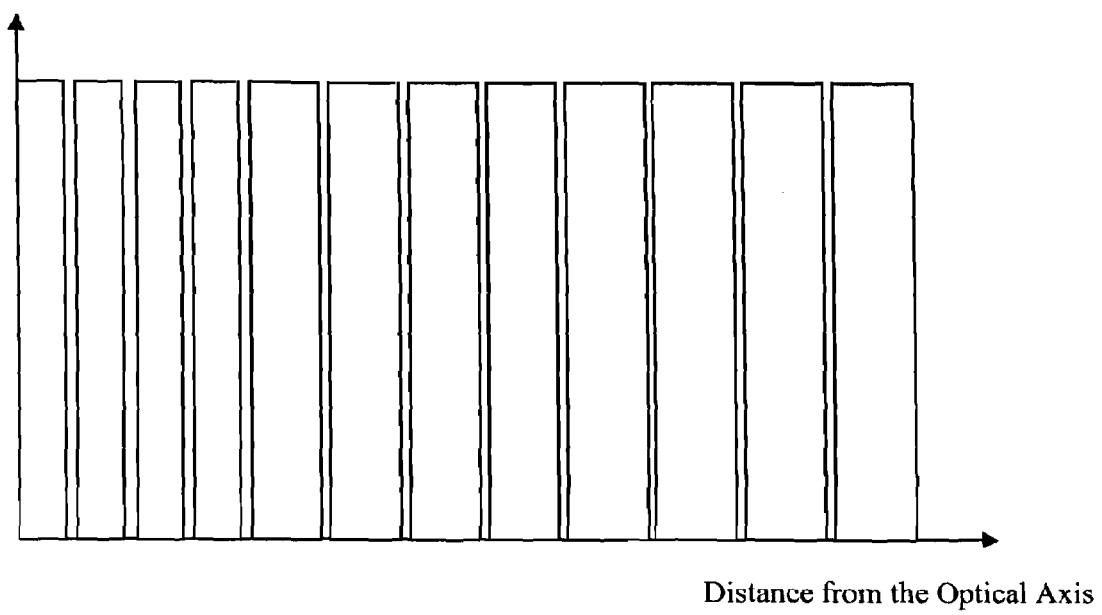
FIG. 10 shows the 'transmittance' (as will be defined herein later) versus the distance from the optical axis of an illumination homogenizing optical element according to the present invention.

In the present invention, an illumination homogenizing optical element is provided that can effectively correct illumination non-uniformity, but the illumination homogenizing optical element of the present invention has a different transmittance distribution from those shown in FIGS. 3(a)-4(b). The transmittance distribution of the illumination homogenizing optical element of the present invention has a transmittance profile that is shown in FIG. 10, namely, the illumination homogenizing optical element of the present invention has steps of constant transmittance (that increase in width toward the periphery of the illumination homogenizing optical element) separated by regions of zero 'transmittance' (as will be defined herein later). As a result of the increasing width of the constant transmittance regions toward the periphery, the illumination homogenizing optical element of the present invention allows more light to travel straight through near the periphery than near the optical axis, thus providing sufficient optical performance to illuminate a surface with even illumination while being easy and inexpensive to manufacture.

Figure 5:
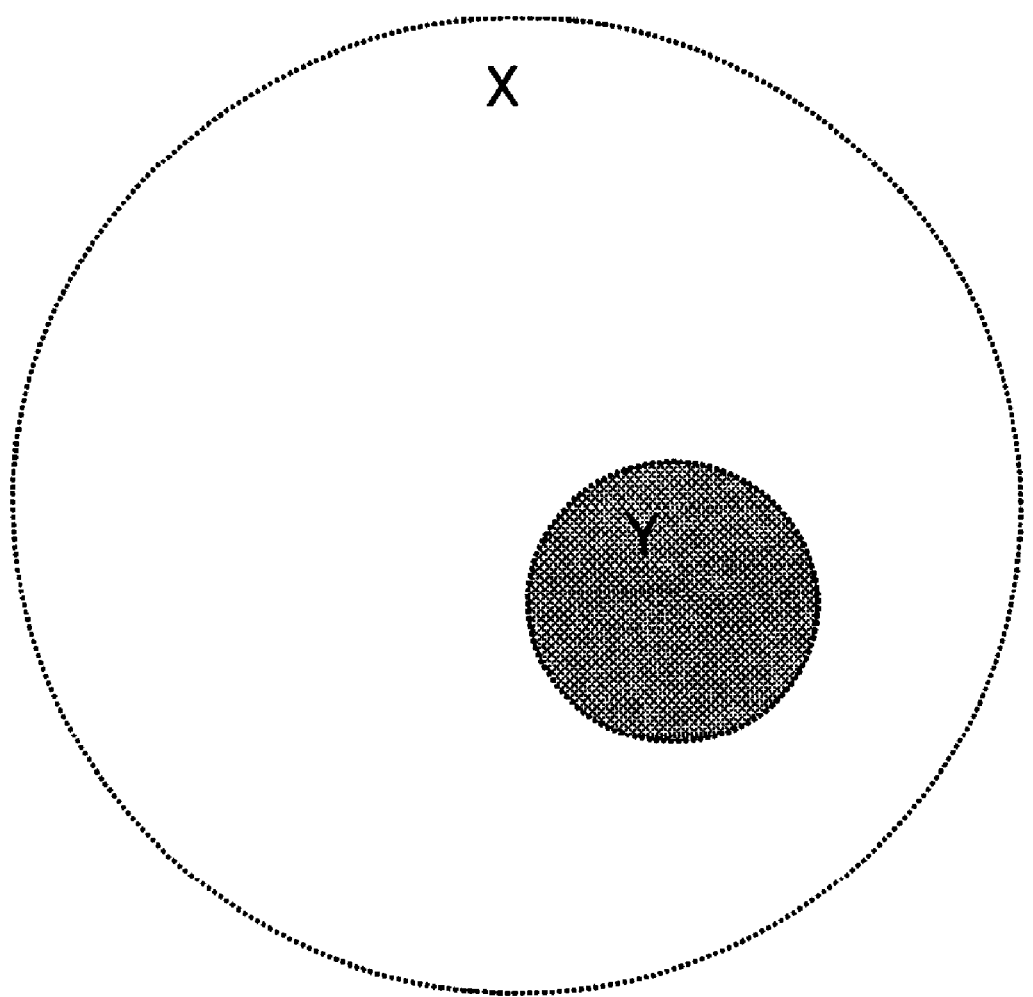
FIG. 5 is a drawing for illustrating a light flux region at the surface A in FIG. 1 that later illuminates a particular point on the illuminated surface.

As is apparent by viewing FIG. 1, the light that is incident onto a particular point of the illuminated surface 5 passes through a region having a particular size in the illumination system. Referring to FIG. 5, for example, light shining on a particular point that is a little deviated from the optical axis at the illuminated surface 5 passes through a region Y at the plane A in FIG. 1. Note that, in FIG. 5, the region X indicates the entire light flux at the plane A that subsequently is incident onto the illuminated surface 5. Thus, the illumination of the one point Y on the illuminated surface 5 can be controlled by controlling the total amount of light passing through the region X.

Figure 6:
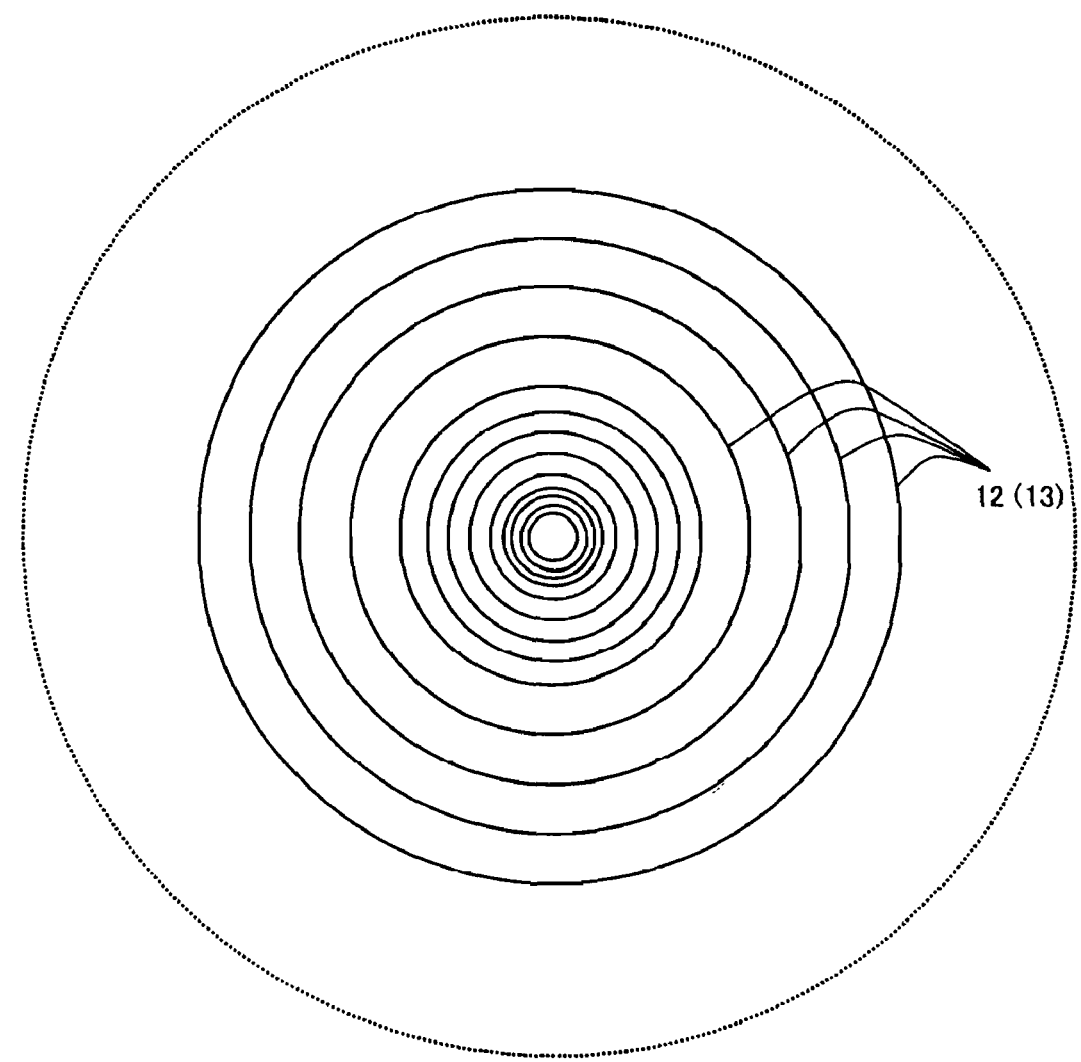
FIG. 6 shows a concentric structure of the plurality of refractive structures according to one example of the illumination homogenizing optical element of the present invention.
Figure 7A:
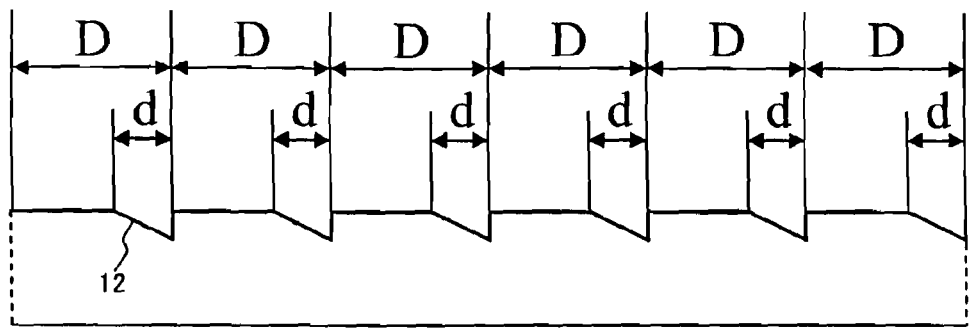
FIG. 7(a) shows an example of a cross-section of the illumination homogenizing optical element according to the present invention when the refractive structures are grooves in the surface of the optical element.
Figure 7B:
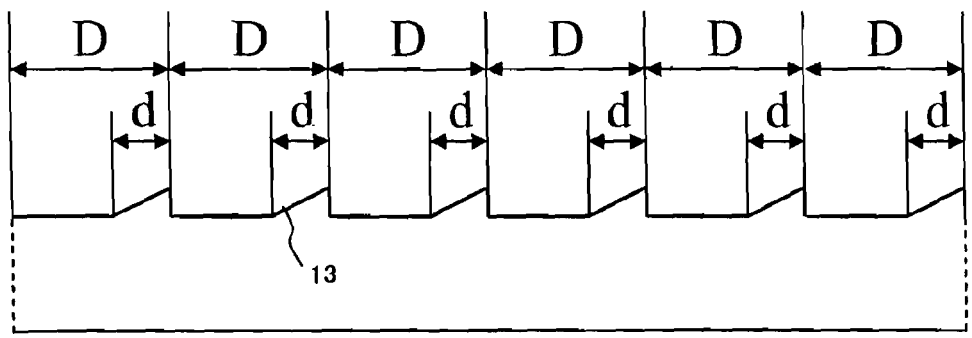
FIG. 7(b) shows an example of a cross-section of the illumination homogenizing optical element according to the present invention when the refractive structures are protrusions on the surface of the optical element.

As illustrated in FIG. 6, in the illumination homogenizing optical element of the present invention, prism-shaped refractive structures such as the grooves 12 or protrusions 13 are formed concentrically on at least one surface of the illumination homogenizing optical element, so that the distribution of the prism-shaped refractive structure varies according to the distance from the optical axis. In addition, as shown in FIGS. 7(a) and 7(b), the cross section of the prism-shaped refractive structures has one surface that is aligned with the light incident onto the illumination homogenizing optical element. In other words, a surface normal of said one surface is perpendicular to the direction of travel of the incident light.

The illumination homogenizing optical element in this embodiment can also utilize grooves that are not concentric. For example, if the illumination non-uniformity is not rotationally symmetric about the optical axis, the arrangement of the grooves should preferably not be rotationally symmetrical about the optical axis. As will be explained in detail later, the present invention can provide sufficiently uniform illumination by utilizing refractive structures, such as grooves or protrusions, which are arranged in a manner other than in a concentric pattern.

The illumination homogenizing optical element of the present invention may be a lens or a filter having prism-shaped refractive structures. Namely, the illumination homogenizing optical element of the present invention may be inserted in an illumination optical system as a new illumination homogenizing optical element, or an already-installed illumination homogenizing optical element may be processed so as to have prism-shaped refractive structures. Needless to say, in a detachable installation form, it is preferred that the illumination homogenizing optical element of the present invention be prepared as a new illumination homogenizing optical element.

While the installation position of the illumination homogenizing optical element relating to the present invention within an optical system is an important design item, there are appropriate conditions to be satisfied. The installation position in a Keller illumination system as shown in FIG. 1 will now be discussed.

In a Keller illumination system that includes a condenser lens, it is preferred that the illumination homogenizing optical element according to the present invention be placed in a conjugate position to a position that satisfies the following condition:

$$0.03 < |L/f_{CD}| < 0.4 \qquad \text{Condition (1)}$$

where $f_{CD}$ is the focal length of the condenser lens 8, and

L is the distance between the condenser lens 8 and the illuminated surface 5.

If the lower limit of the above condition is not satisfied, the position where light passing through the illumination homogenizing optical element is projected toward the illuminated surface will be too near the illuminated surface, and grooves on the illumination homogenizing optical element will be imaged at the image plane. On the other hand, if the upper limit is not satisfied, the position where light passing through the illumination homogenizing optical element is projected toward the illuminated surface will be too far from the illuminated surface 5, and it becomes difficult to obtain the effect of homogenizing the illumination by eliminating the illumination non-uniformity even if the illumination homogenizing optical element of the present invention is inserted. In addition, placing the illumination homogenizing optical element at a conjugate position that is closer to the light source is preferable to placing it between the condenser lens 8 and the illuminated surface 5.

Referring to FIGS. 7(a) and 7(b), the width d of the groove 12 or the protrusion 13 must larger than the wavelength λ of light utilized in the illumination system. Also, the interval D−d between neighboring refractive structures must be larger than the wavelength λ of light utilized in the illumination optical system. The reason for this is that, otherwise, too much light diffracted by the refractive structures will reach the illuminated surface, thereby preventing the objectives of the present invention from being achieved. Namely, the following conditions must be satisfied:

$$d > \lambda \qquad \text{Condition (2A)}$$

$$D - d > \lambda \qquad \text{Condition (2B)}$$

where d is a width of an individual refractive structure among the plurality of refractive structures, D is a pitch, measured in linear units, of the plurality of refractive structures, and λ is the wavelength of incident light.

For example, if the illumination homogenizing optical element of the present invention is used in the illumination device of an optical microscope, it is preferred that the width d of a large majority of refractive structures be 1000 nm or larger. However, if the width d is too large as compared with the diameter r of the illumination homogenizing optical element, shadows will be cast on the illumination surface. Therefore, it is preferred that the following condition be satisfied:

$$d/r \leq 0.001 \qquad \text{Condition (3)}$$

where r is the diameter of the illumination homogenizing optical element, and d is as defined previously.

Next, the geometrical optical actions of the refractive structures of the illumination homogenizing optical element relating to an embodiment of the present invention wherein the refractive structures are prism-shaped grooves will now be explained.

Figure 8:
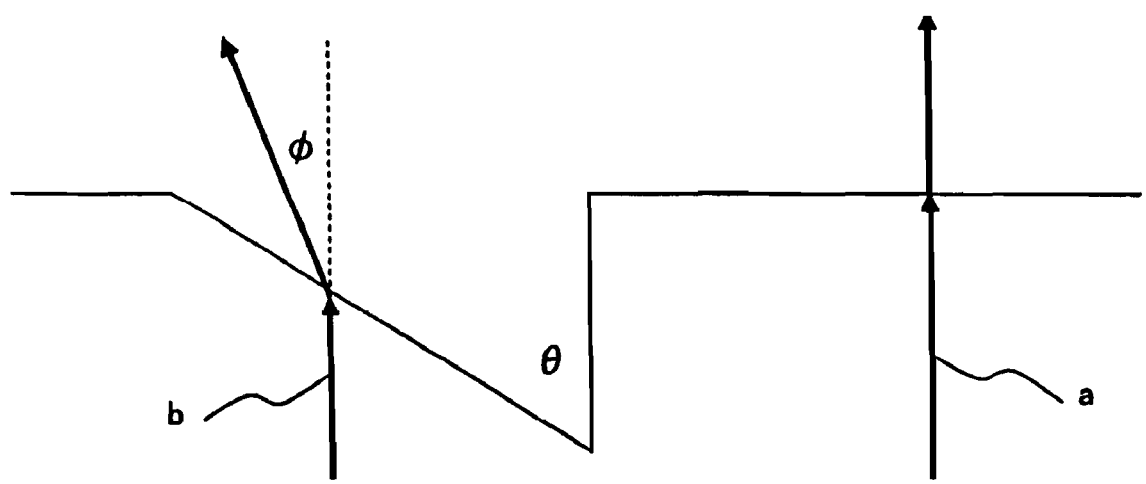
FIG. 8 illustrates the surface angle θ and the deflection angle Φ (both as measured from the direction of the incident rays) in the case where the refractive structures are grooves.

As shown in FIG. 8, a light beam a input onto a surface of the illumination homogenizing optical element such that the surface normal thereof is aligned with the incident beam goes straight through the illumination homogenizing optical element without being refracted. On the other hand, a light beam b incident onto a refractive portion (i.e., in this case, a groove) is refracted an amount Φ (herein termed the deflection angle) according to geometrical optics. In this process, if the deflection angle Φ is set to be sufficiently large, light beams passing through the refractive portion are blocked by the outer diameter of a stop or another illumination homogenizing optical element. Although the deflection angle value that blocks light also depends on the installation position of the illumination homogenizing optical element, a deflection angle of approximately 10 degrees or greater will usually cause the deflected light to be blocked; thus this range of deflection is desirable.

Figure 9:
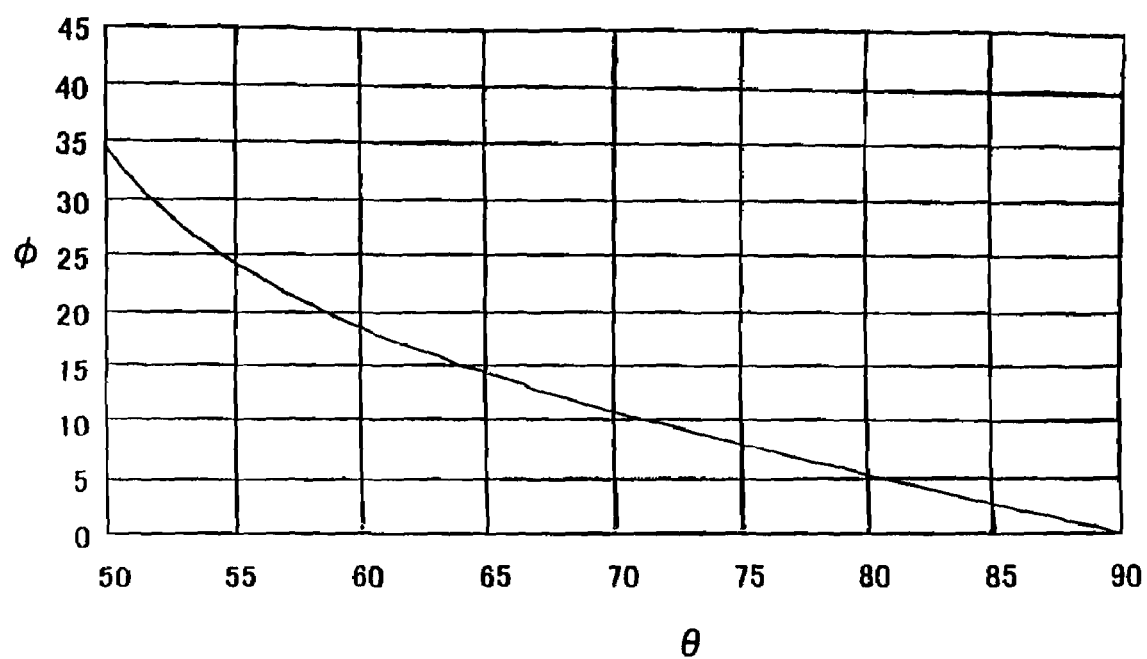
FIG. 9 is a graph of the deflection angle Φ (ordinate) versus the surface angle θ (abscissa) of the refractive structures (i.e., prism-shaped grooves or protrusions) of the present invention.

FIG. 9 is a graph of the deflection angle Φ (ordinate) versus the surface angle θ (abscissa) of the refractive structures. It is desirable that the surface angle θ be less than about 70 degrees. According to the usual definition of 'transmittance', light is transmitted even if it is refracted. However, because light incident onto a refractive structure such as a groove or a protrusion portion is not utilized, herein the term 'transmittance' will refer to the amount of light transmitted by the illumination homogenizing optical element according the present invention and not eliminated by being refracted. Thus, herein, the 'transmittance' at a groove or a protrusion portion of the illumination homogenizing optical element according the present invention will be regarded as being zero. Light can pass through the planar portions of the illumination homogenizing optical element according the present invention without being refracted. However, as is known, a certain amount of light will be reflected by a planar boundary merely due to the change in the refractive index of the two media that form the boundary. For light that is normally incident at a boundary between two transparent media, the transmittance T is given by:

$$T = 1 - [(N'-N)^2/(N'+N)^2]$$    Equation (A)

where

N and N' are the indexes of refraction of the two transparent media that form the boundary.

In addition, if the number of refractive structures per mm decreases according to the distance from the optical axis (as illustrated in FIG. 6), the portions having zero 'transmittance' also become more scarce as the distance from the optical axis increases.

FIG. 10 shows the 'transmittance' (abscissa) versus the distance from the optical axis of the illumination homogenizing optical element according to the present invention. The illumination homogenizing optical element of the present invention is advantageous with regard to manufacturing processing, as compared to the illumination homogenizing optical elements shown in FIGS. 3(a) and 4(a). The illumination homogenizing optical element according to the present invention can cause the illumination distribution at a surface to be sufficiently uniform despite the fact that the illumination homogenizing optical element of the present invention does not have a transmittance profile (such as the one shown in FIGS. 3(b)) that resembles the inverse of an illumination profile produced in an apparatus that illuminates a surface without using an illumination homogenizer. In other words, the illumination homogenizing optical element of the present invention functions adequately to make the illumination sufficiently 'even' or uniform at a surface in spite of the fact that it does not have transmittance which precisely complements the illumination distribution of the illuminated surface when not using the illumination homogenizer. The reason is as follows. In the illumination optical system represented by FIG. 1, the relationship between the illuminated surface and the light source is that of an image and a pupil, respectively. This is due to the illumination non-uniformity on the illuminated surface being caused by the light intensity of light rays from the light source varying with emission angle (as measured relative to the optical axis). On the other hand, the position (e.g., the plane A in FIG. 1) where the illumination homogenizing optical element of the present invention should be installed is neither an image position nor a pupil position, but is an intermediate position. The significance to the illumination homogenizing optical element is that the relationship between position and aperture angle also has an intermediate nature. Thus, the position of the illumination homogenizing optical element surface does not simply correspond to the illuminated surface position, as the relationship with the aperture angle must also be considered. Because this property is utilized in the present invention, the illumination distribution of the illuminated surface can be made sufficiently 'even' (i.e., uniform) in spite of the fact that the illumination homogenizing optical element does not have a transmittance that precisely complements the illumination distribution of the illuminated surface. In this manner, the present invention is similar to that of the prior art illumination homogenizing optical element shown in FIG. 4(a), but is easier and cheaper to manufacture.

Thus, the illumination homogenizing optical element of the present invention corrects a non-uniformity in illumination of a surface while having a transmittance distribution that does not directly cancel the intensity distribution of the light source.

The invention being thus described, it will be obvious that the same may be varied in many ways. For example, there may be a limited number of refractive structures having a width that is not wider than the wavelength of light incident onto the illumination homogenizing optical element, or a limited number of adjacent refractive structures may not have an interval longer than the wavelength of light used, so long as the ratio of: the surface area of such more narrow refractive structures and intervals is sufficiently small that diffraction by said more narrow refractive structure and intervals can be ignored. Also, the optical refractive structures of the illumination homogenizing optical element can be formed on one surface of a conventional optical element such as a filter or a lens. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An illumination device that includes a condenser lens, that has an image position and a pupil position, and that includes an illumination homogenizing optical element having a plurality of refractive structures arranged on at least one optical surface, an individual refractive structure among the plurality of refractive structures being wider than the wavelength of light to be homogenized and used to illuminate a surface, said illumination homogenizing optical element having a wider interval between neighboring refractive structures than said wavelength of light and being positioned other than at an image position or a pupil position of the illumination device.

2. The illumination device according to claim 1, wherein the illumination homogenizing optical element is installed at a position that is an optical conjugate to a position which satisfies the following conditions:

$$0.03 < |L/f_{CD}| < 0.4$$

where $f_{CD}$ is the focal length of the condenser lens, and

L is the distance between the condenser lens and the illuminated surface.

3. The illumination device according to claim 1, wherein the illumination homogenizing optical element is formed on a surface of a filter.

4. The illumination device according to claim 1, wherein the illumination homogenizing optical element is used in a microscope.

5. The illumination device according to claim 1, wherein the illumination homogenizing optical element is used in a projector.

6. The illumination device according to claim 1, wherein the illumination homogenizing optical element is used in a stepper light exposure device.

* * * * *